US006415495B1

(12) United States Patent
Delmerico et al.

(10) Patent No.: US 6,415,495 B1
(45) Date of Patent: Jul. 9, 2002

(54) REFUSE CONTAINER METHOD OF MANUFACTURE AND ASSEMBLY

(75) Inventors: Paul E. Delmerico; Carl R. Schulz, both of Winchester, VA (US)

(73) Assignee: Rubbermaid Commercial Products LLC, Winchester, VA (US)

( * ) Notice: Subject to any disclaimer, the term of this patent is extended or adjusted under 35 U.S.C. 154(b) by 53 days.

(21) Appl. No.: 09/644,514

(22) Filed: Aug. 24, 2000

Related U.S. Application Data

(62) Division of application No. 09/268,390, filed on Mar. 15, 1999, now Pat. No. 6,241,115.

(51) Int. Cl.[7] .................................................. B23P 11/00

(52) U.S. Cl. .......................... 29/434; 29/463; 29/527.1; 264/242; 264/297.8; 264/328.8

(58) Field of Search .............................. 220/908, 908.1, 220/495.06, 495.08, 4.28; 29/434, 527.1, 463; 264/242, 297.8, 297.2, 328.8

(56) References Cited

U.S. PATENT DOCUMENTS

| | | | |
|---|---|---|---|
| 1,364,209 A | 1/1921 | Richardson | 220/908 X |
| 3,309,160 A | 3/1967 | Lewis | 312/308 |
| 3,451,582 A | 6/1969 | Morgan | 220/7 |
| 3,510,055 A | 5/1970 | Safford | |
| 3,528,718 A | 9/1970 | Johnson et al. | |
| D229,279 S | 11/1973 | Kay et al. | |
| 3,793,756 A | 2/1974 | Kay et al. | 40/306 |
| 3,803,738 A | 4/1974 | Weiss | |
| D233,127 S | 10/1974 | Karn, Jr. | |
| D234,288 S | 2/1975 | Kay et al. | |
| 3,917,107 A | 11/1975 | Bottas et al. | 220/65 |
| 3,937,355 A * | 2/1976 | Engerbretsen | |
| 3,982,650 A | 9/1976 | Ichihara | |
| D271,248 S | 11/1983 | Maza et al. | |
| 4,643,380 A * | 2/1987 | Copeland | |

(List continued on next page.)

FOREIGN PATENT DOCUMENTS

| | | |
|---|---|---|
| GB | 1342466 | 1/1974 |
| GB | 1578350 | 11/1980 |
| GB | 2169188 | 7/1986 |
| GB | 2273438 | 6/1994 |

OTHER PUBLICATIONS

Zösch Catalog, wastebaskets, 40 liters, orange and green, item No. 1.110 and 1.111, p. 26.

Zösch Catalog, wastebasket, 50 liter, orange, item No. 1.046, p. 31.

Zösch Catalog, Gitterbox, item No. 1.048.

Rubbermaid Glutton®, Ranger®, and Weathergard® Ranger® Cantainers.

United Receptacle® catalog.

Glasdon UK Ltd Catalog, Topsy and Regency Containers, 2 pages.

Linpac Rotational Mouldings Catlaog, Consort and Studley Litter Bins, 2 pages, Jun. 1992.

Mailbox International Limited Catalog, The Davenport Waste Bin, Victoriana Litter Bin, Aston Post/Wall–Mounted Waste Bin, Litter Bin, Mailbox International Limited, 4 pages.

(List continued on next page.)

*Primary Examiner*—David P. Bryant
(74) *Attorney, Agent, or Firm*—Foley & Lardner

(57) ABSTRACT

A container (10) for housing a waste receptacle (81, 82) includes a base member (11) formed by joining two identical base halves (20, 21). Two interchangeable side walls (12, 13) are attached to the base member (11) and include extensions (16, 17) which form the top (18) of the container (10). Interchangeable front and back walls (14, 15) are provided, the front wall (14) acting as a door and being hingedly attached to one of the side walls (12), and the back wall (15) being attached between the side walls (12, 13). If the waste receptacle is in the form of a plastic bag (82), it may be carried by frame (83) which is moveably mounted on tracks (41) carried by the side walls (12, 13). The container (10) may be manufactured simply by molding the identical parts and connecting them as described.

4 Claims, 4 Drawing Sheets

U.S. PATENT DOCUMENTS

| | | | | | |
|---|---|---|---|---|---|
| 4,923,080 | A | * | 5/1990 | Lounsbury | |
| 4,961,514 | A | | 10/1990 | Palmer | 220/408 |
| D312,523 | S | | 11/1990 | Delmerico et al. | |
| D315,626 | S | | 3/1991 | Delmerico et al. | |
| 5,011,026 | A | | 4/1991 | Hausman et al. | 209/675 |
| 5,012,943 | A | | 5/1991 | King | |
| 5,183,180 | A | * | 2/1993 | Hawkins et al. | |
| D338,758 | S | | 8/1993 | Sextion et al. | |
| 5,235,795 | A | | 8/1993 | DeBusk | |
| 5,265,501 | A | | 11/1993 | Reyes | |
| 5,490,604 | A | * | 2/1996 | Alexander | |
| D373,874 | S | | 9/1996 | Zackson et al. | |
| 5,588,549 | A | | 12/1996 | Furtner | |
| 5,884,556 | A | * | 3/1999 | Klepacki et al. | |
| 6,176,388 | B1 | * | 1/2001 | Orndorff | |
| 6,202,922 | B1 | * | 3/2001 | Phillips et al. | |

OTHER PUBLICATIONS

United Marketing Inc. Catalog, United Marketing Inc., 4 pages.

Pole Mounted Container, 1 page, Jan. 1995.

Glasdon UK Ltd Catalog, Trimline Collection and Dog Waste Collection, 3 pages, 1992.

Swintex Limited Catalog, Osprey, Nickleby, Doggybin, Castle Collection, 5 pages.

Mailbox International Limited Catalog; Regency Range, Pet Hygiene Range, Waste bins, Combined Ash/litter bins, 3 pages.

Rossignal Catalog, Vianet 60 and 30, Proximi Wall and Post Mounted Bin, Collec'car Steel Trash Can, 3 pages, 1994.

Säkkiväline Oy Catalog, City Litter Container, 2 Pages.

Plastopan Catalog, 50L Plastopan Multi Outdoors, Plastopan Multi with Ashtrays, Plastopan Multi for Used Batteries, Plastopan Multi–Medi for Used Medications; Plastopan Multi–Fiffi for Pet Hygenie, 2 pages.

Otto Catalog, Post Mounted Outdoor Waste Containers, Frankfurt, Germany, Jun. 1995.

Otto Catalog, 50–Liter–Waste Basket, Trash Collector KS 70, Frankfurt, Germany, 1 page.

Otto Catalog, Wastebasket M2, Wastebasket 900, Wastebasket 700/W, Wastebasket 1000/D/VZ, and Wastebasket 500/N, Frankfurt, Germany, 1 page.

Excerpt from a German Catalog, "Formschöne Abfal", 2 pages, (undated).

Glasdon UK Ltd. advertisement, 1 page, (undated).

Howard advertisement "A Modern Color Coordinated Concept in Total Indoor & Outdoor Litter Control", 2 pages, (undated).

Continental Manufacturing Company "King Kans" advertisement, 1 page, (1992).

"Co–Ordinated Litter Bins" advertisement, 1 page, (undated).

Wausau Tile, Inc. advertisement, 2 pages, (undated).

Witt "Street Smart" advertisement, 2 pages, (undated).

* cited by examiner

REFUSE CONTAINER METHOD OF MANUFACTURE AND ASSEMBLY

This application is a division of application Ser. No. 09/268,390, filed Mar. 15, 1999, now U.S. Pat. No. 6,241,115.

TECHNICAL FIELD

This invention relates to a refuse container of the type which houses a waste-receiving receptacle. Moreover, this invention relates to a method of economically manufacturing and assembling the refuse container.

BACKGROUND ART

Refuse containers which house a separate, removable waste-receiving receptacle are known in the art. Such are most prevalently found in indoor and outdoor commercial environments and typically include a container portion with a removable or hinged domed or hooded top. The domed top is usually provided with one or more openings, sometimes closed with a swinging door, through which the refuse may pass to be received by a waste receptacle positioned within the container. A major problem with these types of containers arises when the waste receptacle needs to be removed and emptied. To do so, the domed top is removed to gain access to the receptacle, and then the user must reach down into the container and vertically lift the receptacle with his/her arms extended. Such is not only awkward but also can be difficult, particularly if the receptacle is filled with heavy refuse.

In an attempt to solve the problem, some refuse containers are provided with a door positioned in a portion of one side of the container which can be swung open for more facile removal of the receptacle. While providing a partial solution to the problem, such, of course, generally requires that the container be square or rectangular in profile, as opposed to round. In addition, since many modern refuse containers are made of plastic, the most feasible way to manufacture these products is by the rotational molding process. However, using such a process results in a less sturdy, and less aesthetically appealing product, and the rotational molding process would not adapt itself to provide a container which would advantageously have one full side acting as a door.

In order to provide a container having one complete side thereof acting as a door, the manufacturing and assembly costs associated therewith could create another problem. Usually molds must be created for six, or more, separate parts, and then each of these parts, which include at least a bottom, top, and four sidewalls, must be separately injection molded and then assembled. Such is a costly procedure.

Finally, known refuse containers are most often designed to utilize and house only separate waste receptacles. These receptacles too must be molded, and therefore such adds to the cost of the overall system. Moreover, most users purchase plastic liner bags which are positioned in the receptacle to receive the refuse. However, few known refuse containers advantageously permit the use of only a plastic liner bag which can be easily removed from the container thereby eliminating the need for the separately molded waste receptacle.

Thus, the need exists for a refuse container which can be efficiently manufactured and assembled, and a container which permits easy removal of the separate waste receptacle therefrom. The container should also have the ability to accept and hold only a plastic bag receptacle, at the option of the user.

DISCLOSURE OF THE INVENTION

It is thus an object of the present invention to provide a unique container for housing a waste receptacle.

It is another object of the present invention to provide a container, as above, which can optionally house a conventional waste receptacle or a plastic bag receptacle.

It is an additional object of the present invention to provide a container, as above, which is manufactured from a minimum number of interchangeable parts.

It is a still further object of the present invention to provide a container, as above, which is produced by a simple method of manufacturing and assemblage.

It is yet another object of the present invention to provide a container, as above, in which the container is manufactured by twice molding four components.

These and other objects of the present invention, as well as the advantages thereof over existing prior art forms, which will become apparent from the description to follow, are accomplished by the improvements hereinafter described and claimed.

In general, a container for a waste receptacle made in accordance with the present invention includes a base member having opposed interchangeable side walls and opposed interchangeable front and back walls extending upwardly therefrom to form a housing for the receptacle. The back wall is attached between the side walls and the front wall is hingedly attached to one of the side walls to form a door to gain access to the receptacle.

In accordance with another aspect of the present invention, the waste receptacle may be in the form of a plastic bag carried by a frame assembly. The frame assembly is moveable in tracks carried by opposed walls for ease of access to the bag.

The container is manufactured and assembled by first molding two identical side walls, two identical front and back walls, and forming a base member. The side walls are attached to opposed sides of the base member. The back wall is attached to another side of the base member, and the front wall is attached to one of the side walls.

A preferred exemplary refuse container incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
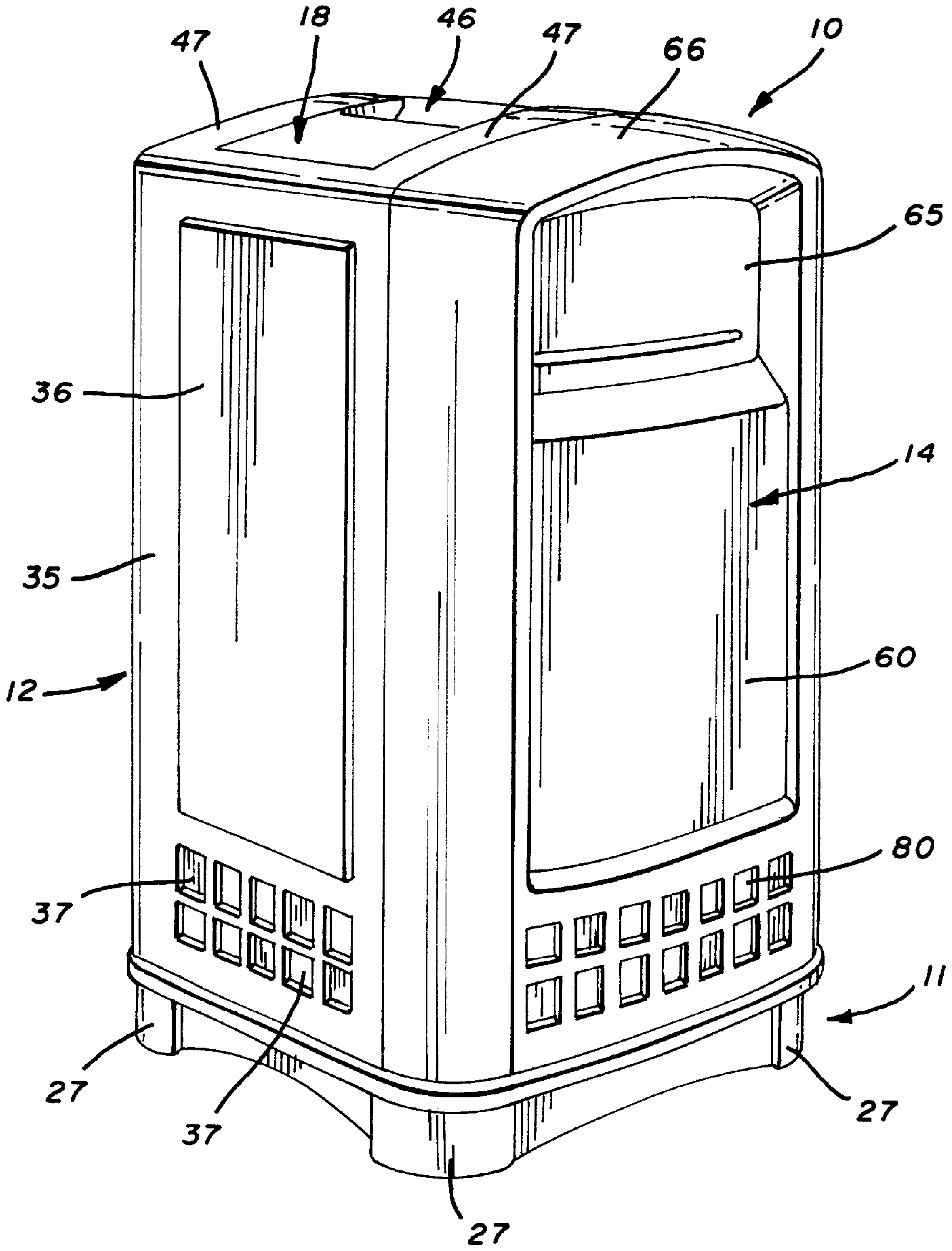
FIG. 1 is a perspective view of a refuse container made in accordance with the concepts of the present invention.

A container made in accordance with the present invention is indicated generally by the numeral 10 and includes as its major components a base member indicated generally by the numeral 11, preferably identical side walls generally indicated by the numerals 12 and 13, and preferably identical front and rear walls generally indicated by the numerals 14 and 15, respectively. As will be discussed hereinafter in more detail, side walls 12 and 13 also include extensions, generally indicated by the numerals 16 and 17, respectively, which form the top surface of container 10, which top surface is generally indicated by the numeral 18. All of these components of container 10 are preferably formed by an injection molding, gas-assisted process, of a sturdy plastic material such as polyethylene.

Figure 4:
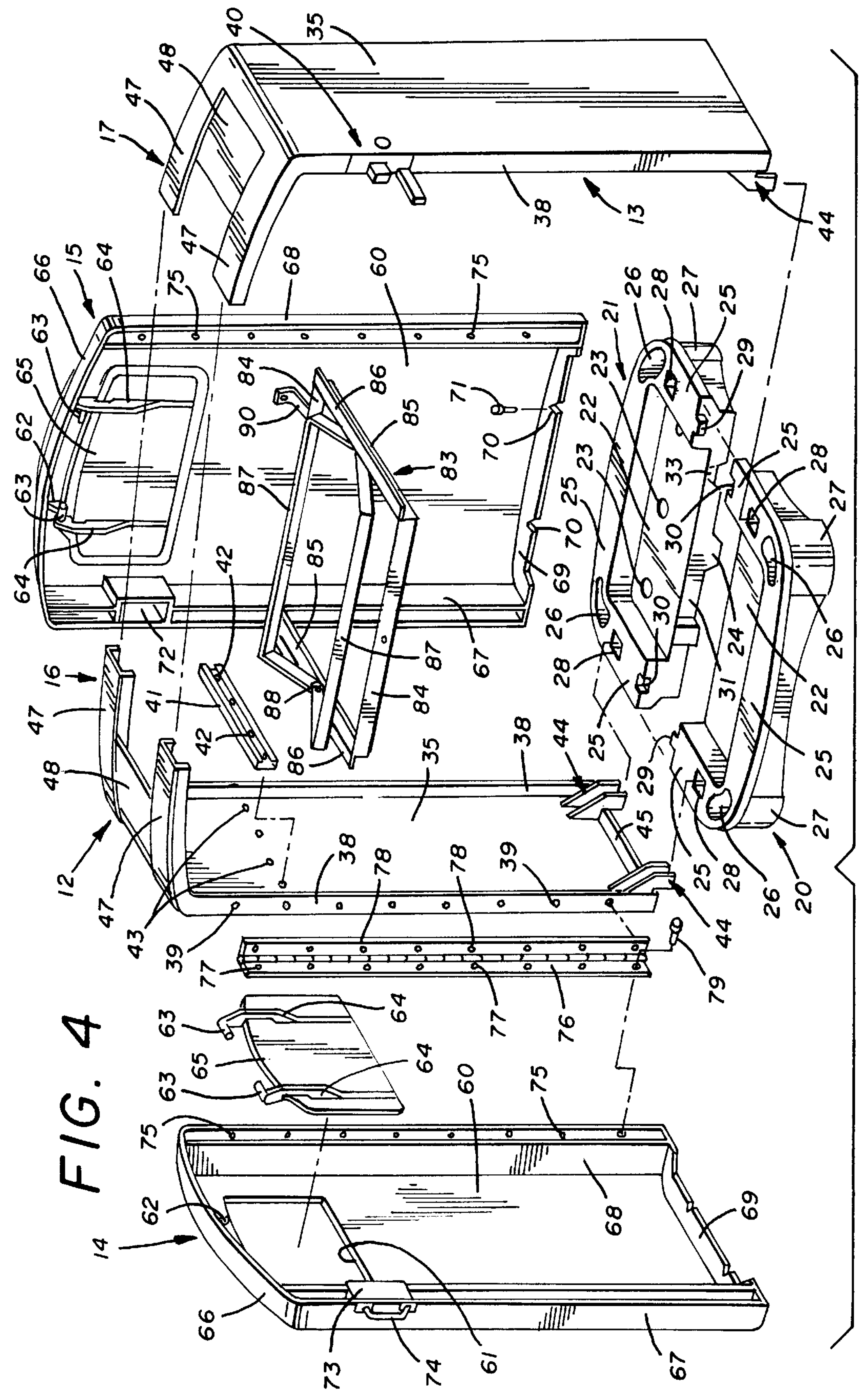
FIG. 4 is a somewhat schematic exploded view showing the component parts of the refuse container of FIG. 1 and the manner in which it is assembled.

Base member 11 is advantageously formed in two halves shown in FIG. 4 and indicated generally by the numerals 20 and 21. Because halves 20 and 21 are identical, like reference numerals will be applied to both halves 20 and 21.

As such, each half 20 and 21 includes half of a container floor surface 22, which may have drain holes 23 extending therethrough, and half of a central foot 24 extending downwardly therefrom. Each base half 20 and 21 also includes a peripheral ledge 25 extending upwardly from floor surface 22. The corners at the end of ledge 25 are provided with depressions 26 to assist in forming sturdy corner feet 27 positioned therebelow. The sides of ledge 25 are each provided with apertures 28 which, as will hereinafter be described, serve to assist in attaching side walls 12 and 13 to base member 11. The mating edges of base halves 20 and 21 are each provided with a complimentary tongue 29 and groove 30 located near the top edge of ledge 25. The mating faces 31 of base halves 20 and 21 also each include a complementary protrusion 32 and recess 33 formed therein.

Base member 11 is formed by joining base halves 20 and 21. When the mating faces 31 of halves 20 and 21 are placed adjacent to each other, tongue 29 of half 20 is received in groove 30 of half 21 and tongue 29 of half 21 is received in groove 30 of half 20. Such may be maintained in place by means of suitable mechanical fasteners (not shown). Likewise, protrusion 32 of half 20 is received in recess 33 of half 21 and protrusion 32 of half 21 is received in recess 33 of half 20 to provide greater stability to the connection.

Figure 2:
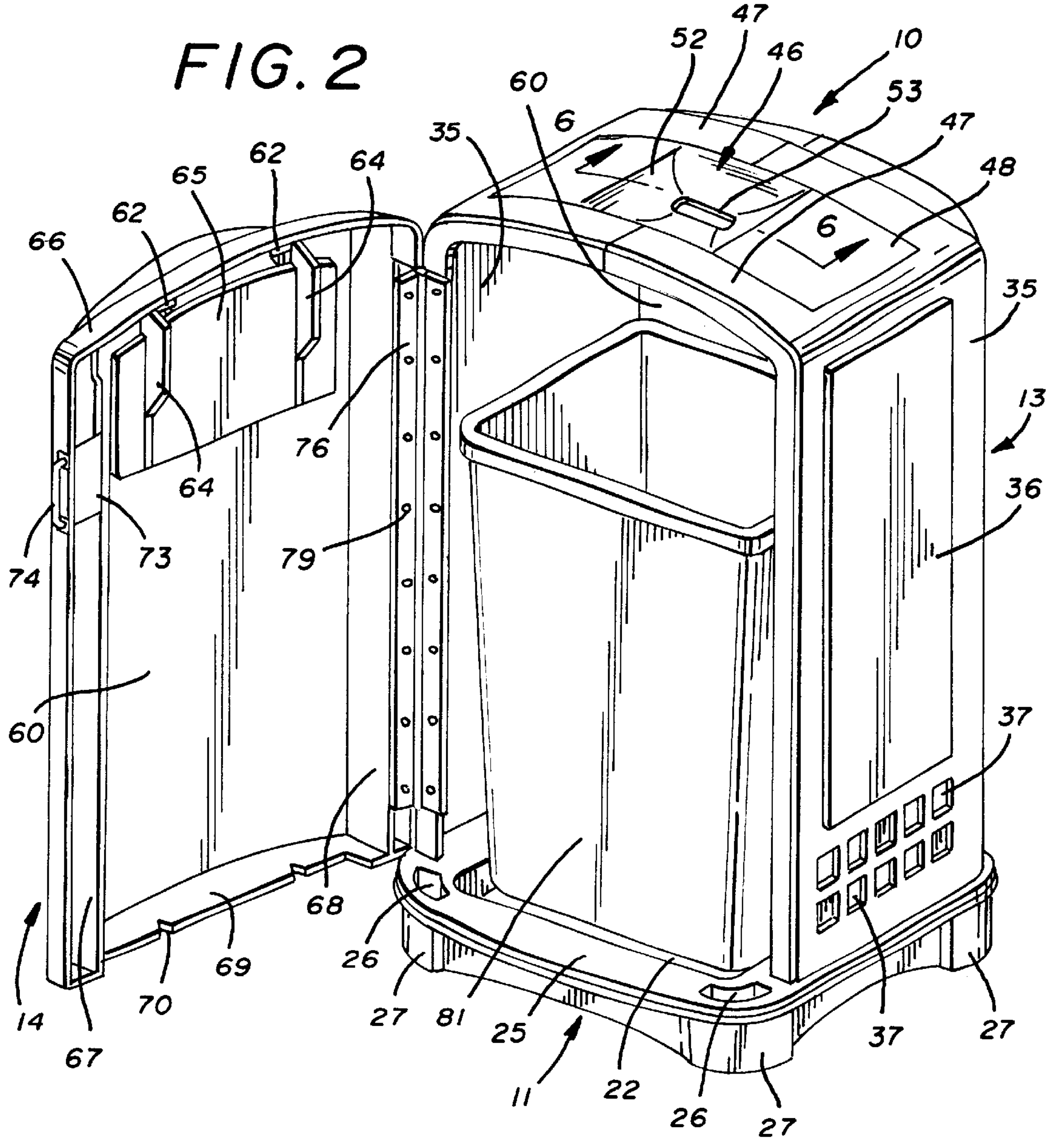
FIG. 2 is a somewhat schematic perspective view of the refuse container of FIG. 1 showing the door open and a conventional waste receptacle therein.
Figure 3:
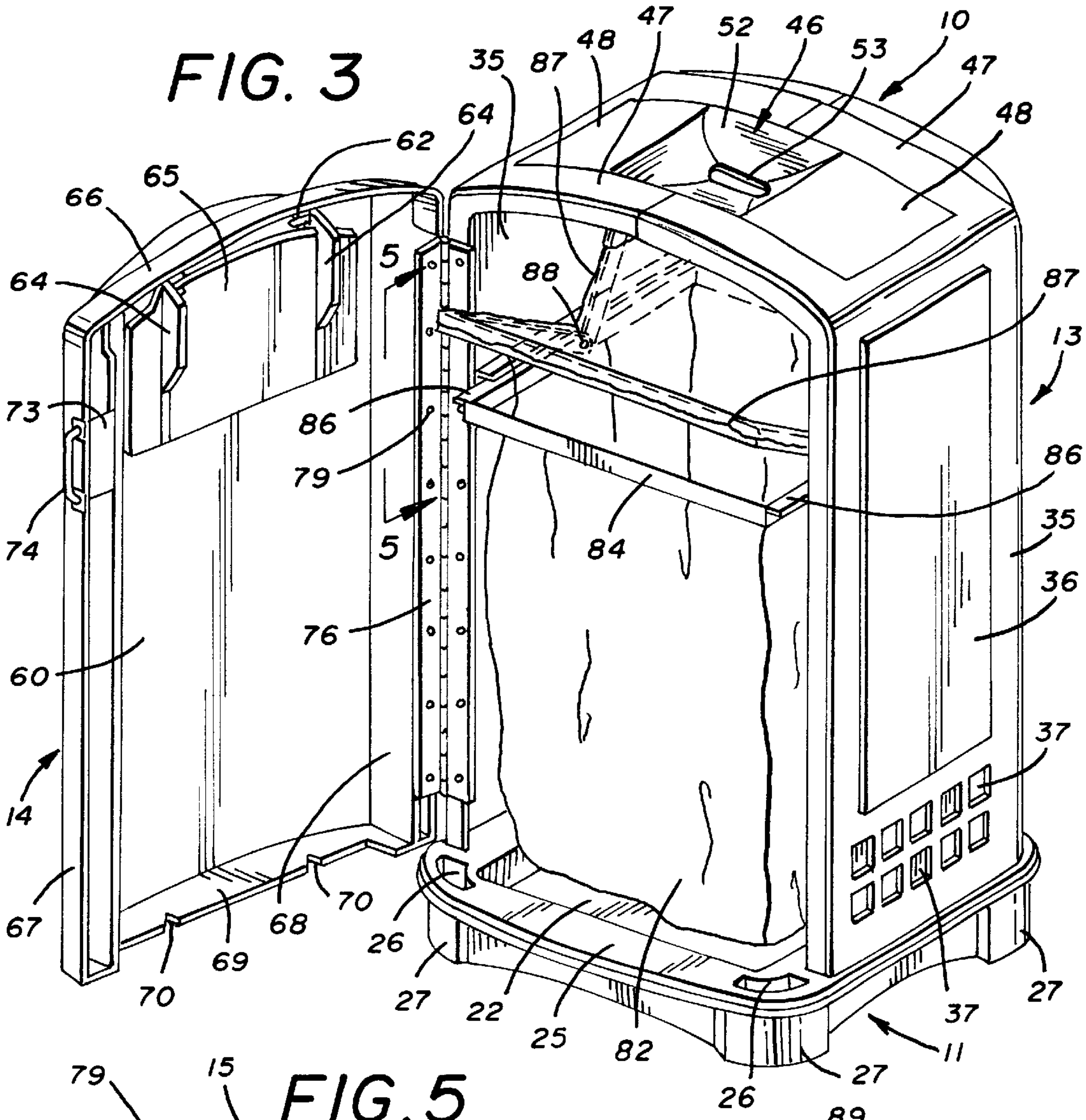
FIG. 3 is a somewhat schematic perspective view similar to FIG. 2 but showing the manner in which the container may carry a plastic bag waste receptacle instead of the conventional waste receptacle therein.

Referring now to side walls 12 and 13, since they are identical, like reference numerals will be applied when describing both of them. Thus, each side wall 12, 13 includes an upstanding side panel 35 which, as shown in FIGS. 1–3, may be formed with a raised decorative panel 36, and may also be formed with decorative depressions 37. Side flanges 38 extend inwardly from each edge of panels 35, and one side flange 38 of each side wall 12, 13 is provided with a plurality of apertures 39 to assist in the connection of a side wall 12 or 13 to front wall 14 in a manner to be hereinafter described. The other side flange 38 can be optionally provided with a location for a locking mechanism, generally indicated by the numeral 40.

A C-shaped track 41 is attached to the inside of each panel 35. For that purpose, track 41 is provided with a plurality of apertures 42 therethrough which can be aligned with apertures 43 in each panel to receive suitable mechanical fasteners (not shown).

Two pairs of gusset plates 44 are formed at the bottom of each panel 35 and extend downwardly therefrom to thereby form feet which can be received in apertures 28 of base member 11 to attach side walls 12 and 13 to base member 11. Again, suitable mechanical fasteners (not shown) may be utilized to assure that the connection between side walls 12 and 13 to base member 11 is stable. Moreover, a stabilizing rib 45 which extends between the pairs of gusset plates 44 may be provided, and when side walls 12 and 13 are attached to base member 11, ribs 45 will rest on ledge 25 of base member 11.

As previously described, side walls 12 and 13 include inwardly directed extensions 16 and 17, respectively, which cooperate to form container top 18. Extensions 16 and 17 are thus integrally molded with side walls 12 and 13, respectively. While extensions 16 and 17 may merely be slightly domed, continuous, solid plates, if desired, container 10 may be provided with a top feature that includes an ashtray assembly, generally indicated by the numeral 46, to be hereinafter described. When provided with the ashtray 46 feature, extensions take on a bifurcated configuration having spaced inwardly extending arms 47 with a solid top panel 48 extending partially therebetween. When side walls 12 and 13 are positioned on base member 11, as previously described, the ends of arms 47 may be joined, as by any suitable fastening system, such as an internal tongue and groove arrangement (not shown) with the assistance of mechanical fasteners (not shown). When so attached, a space between arms 47 and between panels 48 forms an aperture in top surface 18 which may be utilized for receiving the optional ashtray assembly 46, now to be described.

Figure 6:
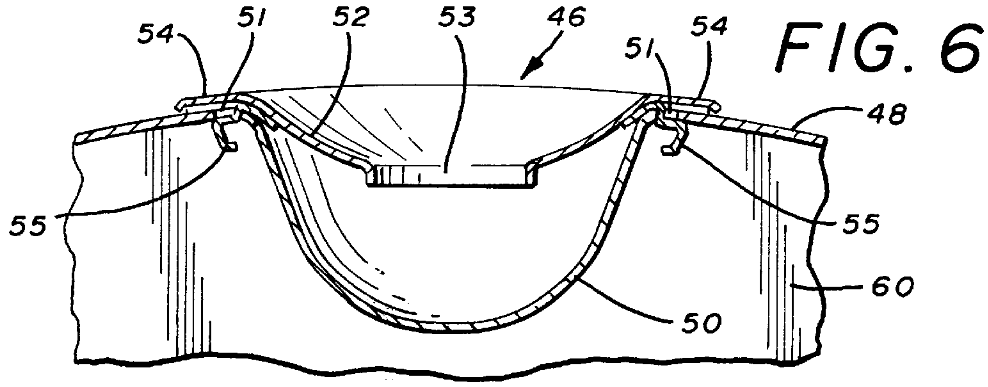
FIG. 6 is a fragmented sectional view taken substantially along line 6—6 of FIG. 2.

As best shown in FIG. 6, ashtray assembly 46 includes a collecting bowl 50 which has an upper laterally extending flange with opposed slots formed therein, as indicated by the numeral 51. An upper bowl 52 has a central aperture 53 formed therein so that cigarettes and the like, extinguished by contact with upper bowl 52, can pass through aperture 53 and into collecting bowl 50. Upper bowl 52 also has a peripheral flange 54 with opposed, resilient lock clips 55 extending downwardly therefrom. Ashtray assembly 46 is inserted into the space between the panels 48 by first positioning collecting bowl 50 in that space, with its flange thereby resting on the top of panels 48. Then one lock clip 55 of upper bowl 52 is inserted through a slot 51 in the flange of collecting bowl 50. At that point, the other lock clip 55 can be inserted through the other slot 51 and the ashtray assembly is attached to container 10 as shown in FIG. 6. As can be seen, the flange and slot 51 of the collecting bowl 50 are thereby positioned between flange 54 of upper bowl 52 and top panels 48, and assembly 46 is held in place as clips 55 are bearing against the underside of panels 48.

Referring now to FIG. 4 and the front wall 14 and rear wall 15 shown therein, since they are basically identical, like reference numerals will be applied when describing them. As such, each include a main panel 60 having a window opening 61 formed near the top thereof. As can be seen in FIGS. 1 and 2, window openings 61 are recessed with respect to main panel 60. Opposed bosses 62 formed above window openings 61 on the inside of panel 60 are adapted to receive opposed pins 63 formed on arms 64 carried by doors 65. Doors 65 thus pivot on pins 63 and in their normal position, they close window openings 61. However, doors 65 may readily be pivoted inwardly to permit the ingress of refuse into container 10.

Figure 5:
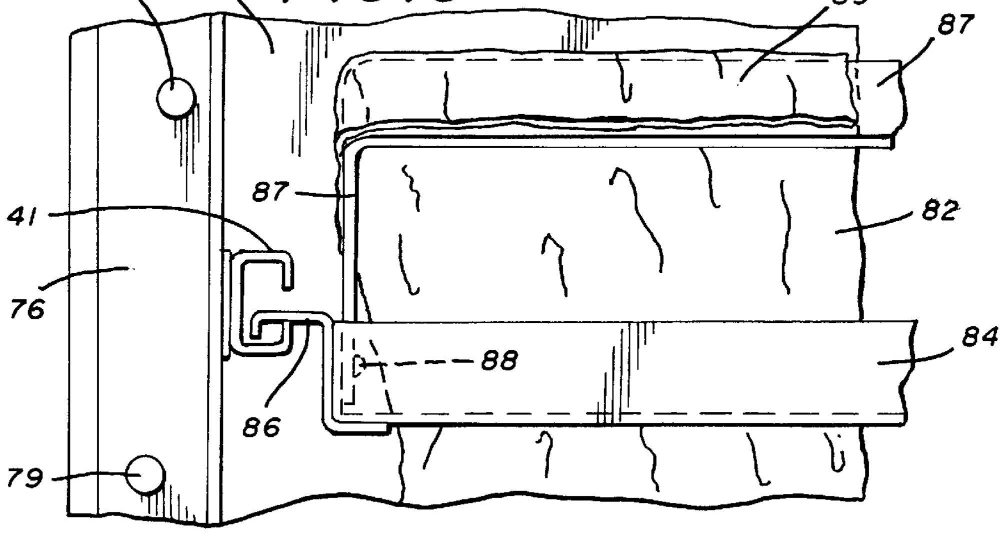
FIG. 5 is a fragmented sectional view taken substantially along line 5—5 of FIG. 3.

Front and rear walls 14 and 15, respectively, have a peripheral framework extending inwardly therefrom in the form of an arched top 66, vertical side framework 67 and 68, and a bottom flange 69. Bottom flange 69 may be notched, or have apertures formed therein, as at 70, to receive fasteners 71 to mount rear wall 15 to the ledge 25 of base member 11. Side framework 67 includes a compartment 72 to receive a striker plate and other lock components 73 for front wall 14 which cooperate with locking mechanism 40 to selectively lock front wall 14 to side wall 13 in a manner well known in the art. Since front wall 14 is acting as a door for container 10, a handle 74 may be attached thereto at the area of striker plate compartment 72. Side framework 68 is provided with a plurality of vertically spaced apertures 75. Apertures 75 cooperate with apertures 39 on side wall 12 so that front wall 14 may be hingedly attached to side wall 12 by means of a hinge plate 76 having apertures 77 and 78 therein. Apertures 39, as well as apertures 75, may be intentionally vertically misaligned, as shown in FIG. 5, for added strength. Thus, the wall selected as front wall 14 constitutes a door that is attached to hinge plate 76 by fasteners 79 received through apertures 77 and into apertures 75, and hinge plate 76 is likewise attached to side wall 12 by means of fasteners, such as 79, extending through apertures 78 and into apertures 39. Finally, as shown in FIG. 1, walls 14 and 15 may be provided with decorative depressions 50 to compliment depressions 37.

With side walls 12 and 13 in place on base member 11 as previously described, the wall selected as rear wall 15 may be mounted on base member 11, also as previously described. In addition, rear wall 15 may be attached to side walls 12 and 13 in any suitable manner. For example, mechanical fasteners (not shown) can extend through side flanges 38 of side walls 12 and 13 and into side framework 67 and 68 of rear wall 15.

Since the major components of container 10, as they now have been described, are formed in identical pairs, the molding process therefor is quite simple. A single injection mold may be provided having four mold cavities, one for a base half 20 or 21, one for a side wall 12 or 13, one for a front or back wall 14 or 15, respectively, and one for a door 65. After two cycles of the injection molding press, the eight molded parts are ready for assembly.

As previously described, such assembly is perfected by attaching base halves 20 and 21 and mounting side walls 12 and 13 to the assembled base member 11 while at the same time attaching extensions 16 and 17 to form the container top 18. Doors 65 may then be attached to front and back walls 14 and 15, and one of the remaining molded members is then selected to be the back wall 15, and it is attached to base member 11 and side walls 12 and 13. The remaining molded member is front wall 14 and it is attached, via hinge plate 76, to side wall 12.

The assembled container 10 may thus receive a conventional molded plastic waste receptacle 81, as shown in FIG. 2. As such, refuse may be passed through windows 61 and into waste receptacle 81, and in order to remove and empty receptacle 81, one need only open front wall 14 and slide receptacle 81 out of container 10.

Container 10 is also designed to receive a conventional plastic bag waste receptacle 82. The manner in which bag receptacle 82 is positioned within container 10 is shown in FIGS. 3–5, and includes structure intended to be used with the tracks 41 previously described. A frame assembly, generally indicated by the numeral 83, includes a rectangular, preferably metal frame having front and rear plates 84 and side plates 85. Side plates 85 are provided with rails 86 which are received in tracks 41. Frame assembly 83 also includes generally U-shaped arms 87, preferably made of a plastic material, which are pivotally attached, as at 88, at generally the center of side plates 85. As such, arms 87 are pivotal from an upper position shown in the drawings to a position whereby they are adjacent to and flush with plates 84 and 85 of frame assembly 83.

The upper edge 89 of bag receptacle 82 is wrapped around arms 87, when in their upper position, and then arms 87 are pivoted downwardly to the position adjacent to plates 84 and 85 so that the bag receptacle 82 is thereby frictionally engaged between arms 87 and plates 84 and 85. As such, bag receptacle 82 is supported by frame assembly 83 which is, in turn, supported within container 10 on tracks 41 in a position to receive refuse through windows 61. To remove and dispose of bag receptacle 82, upon opening front wall 14 on hinge plate 76, frame assembly 83 may be moved out of container 10 by pulling it along tracks 41. The outward movement of frame assembly 83 may be limited so that it does not come out of tracks 41 by a strap 90 connected to rear plate 84 and attached to back wall 15. Arms 87 may then be raised and the bag receptacle 82 removed therefrom. As such, the bag receptacle 82 may be lowered beneath frame assembly 83 and easily laterally removed from container 10 with another bag receptacle 82 being positioned, locked in place, and slid into container 10 by pushing frame assembly 83 along tracks 41.

From the foregoing, it should thus be evident that a container constructed as described herein substantially improves the art and otherwise accomplishes the objects of the present invention.

What is claimed is:

1. A method of manufacturing and assembling a container comprising the steps of molding two identical side walls, molding identical front and back walls, forming a base member, attaching the side walls to opposed sides of the base member, attaching the back wall to another side of the base member, and attaching the front wall to one of the side walls, wherein the step of forming the base member includes the step of molding two identical base halves and attaching the base halves.

2. A method of manufacturing and assembling a container comprising the steps of molding two identical side walls, molding identical front and back walls, forming a base member, attaching the side walls to opposed sides of the base member, attaching the back wall to another side of the base member, and attaching the front wall to one of the side walls, wherein the front and back walls are molded with windows therein and further comprising the steps of molding a door for each window and attaching a door to the back wall and the front wall adjacent to the window.

3. A method of manufacturing and assembling a container comprising the steps of molding two identical side walls, molding identical front and back walls, forming a base member, attaching the side walls to opposed sides of the base member, attaching the back wall to another side of the base member, and attaching the front wall to one of the side walls, wherein the steps of molding are accomplished by providing a mold with four cavities, one cavity for a side wall, one cavity for a base half, one cavity for a front or back wall, and one cavity for a door; positioning the mold in a press; and cycling the press twice to mold eight components.

4. A method of manufacturing and assembling a container comprising the steps of molding two identical side walls, molding identical front and back walls, forming a base member, attaching the side walls to opposed sides of the base member, attaching the back wall to another side of the base member, and attaching the front wall to one of the side walls, wherein the step of molding the side walls includes the step of molding the side walls with an upper extension, and further comprising the step of attaching the extensions to form a top portion for the container.

* * * * *